United States Patent [19]
Liu

[11] Patent Number: 4,915,472
[45] Date of Patent: Apr. 10, 1990

[54] OPTICAL FIBER TERMINAL PLUG CONNECTORS

[75] Inventor: Wing S. Liu, Lawrenceville, Ga.

[73] Assignee: American Telephone and Telegraph Company, AT&T Bell Laboratories, Murray Hill, N.J.

[21] Appl. No.: 290,965

[22] Filed: Dec. 28, 1988

[51] Int. Cl.⁴ ............................................. G02B 6/36
[52] U.S. Cl. .............................. 350/96.21; 350/96.20
[58] Field of Search ................ 350/96.20, 96.21, 96.22

[56] References Cited

U.S. PATENT DOCUMENTS

| | | | |
|---|---|---|---|
| 3,885,859 | 5/1975 | Dalgleish et al. | 350/96.21 |
| 3,919,037 | 11/1975 | Miller | 350/96.21 |
| 3,972,585 | 8/1976 | Dalgleish et al. | 350/96.21 |
| 4,057,448 | 11/1977 | Miller | 350/96.21 X |
| 4,077,702 | 3/1978 | Kunze et al. | 350/96.21 |
| 4,111,522 | 9/1978 | Auracher et al. | 350/96.21 |
| 4,123,139 | 10/1978 | Sandahl | 350/96.21 |
| 4,148,553 | 4/1979 | Asam | 350/96.21 |
| 4,179,186 | 12/1979 | Tynes | 350/96.21 |
| 4,193,665 | 3/1980 | Arnold | 350/96.21 X |
| 4,205,898 | 6/1980 | Mathews et al. | 350/96.21 |
| 4,208,095 | 6/1980 | Malsot | 350/96.21 |
| 4,217,031 | 8/1980 | Mignien et al. | 350/96.21 |
| 4,239,333 | 12/1980 | Dakss et al. | 350/96.21 |
| 4,274,708 | 6/1981 | Cocito et al. | 350/96.21 |
| 4,353,619 | 10/1982 | Parr | 350/96.21 |
| 4,353,620 | 10/1982 | Schultz | 350/96.21 |
| 4,470,180 | 9/1984 | Blomgren | 24/563 |
| 4,541,685 | 9/1985 | Anderson | 350/96.21 |
| 4,545,644 | 10/1985 | DeVeau, Jr. et al. | 350/96.21 |

FOREIGN PATENT DOCUMENTS

| | | | |
|---|---|---|---|
| 60-247204 | 12/1985 | Japan | 350/96.21 X |
| 1520679 | 2/1976 | United Kingdom | 350/96.21 X |
| 2022284A | 12/1979 | United Kingdom | 350/96.21 X |

OTHER PUBLICATIONS

"Fiber-Optic Splicing Tool", by L. Balliet and O. R. Gupta, *IBM Technical Disclosure Bulletin*, vol. 25, No. 7A, Dec. 1982.

*Primary Examiner*—John D. Lee
*Assistant Examiner*—Brian M. Healy
*Attorney, Agent, or Firm*—Ruloff F. Kip

[57] ABSTRACT

There is disclosed a connector for two terminal plugs having bores in which are recieved respective optical fibers having free ends terminating at the front ends of such plugs. The connector comprises a longitudinal sleeve of sheet metal having a bottom, back and top and a longitudinal opening at its front. The sleeve contains a guide disposed alongside a longitudinal passage through the sleeve for receiving the two plugs end-to-end. The sleeve top is divided by lateral slits into two central resilient fingers and two resilient tabs at the sleeve ends. The fingers exert forces to press the end-to-end plugs against the guide to align them, while the tabs exert greater forces on the guide to maintain it clamped with the sleeve. The slits extend part way down the back of the sleeve, the guide has beveled edges, and the mentioned opening is bordered by top and bottom lips adapted to be pried apart by a pliers tool.

26 Claims, 4 Drawing Sheets

OPTICAL FIBER TERMINAL PLUG CONNECTORS

FIELD OF THE INVENTION

This invention relates generally to connectors for interconnecting two optical fibers to permit substantially unattenuated passage of radiation from one to the other. More particularly, this invention relates to connectors of such kind in which such interconnection is effected by what has become known as a rotary mechanical splice.

BACKGROUND OF THE INVENTION

In utilizing the mentioned splice, the free ends of the two fibers are received in axial bores in two cylindrical glass ferrules or plugs to extend slightly beyond the front ends of such plugs. Those front ends are then ground down to make the front end of each fiber with the front surface of its corresponding plug and to assure that such front end is normal to the plug's axis.

Next, the two terminal plugs for the fibers are brought into bearing relation with a guide means such that the front ends of the plugs are in end-to-end relation and the axes of the two plugs are aligned by the guide means to be co-parallel. For the purpose of making the mentioned splice, the exteriors of the two plugs are close enough to true circular cylindrical that such plugs can be treated as being perfect cylinders having plug axes from which, in each plug, all radii from its axis to its cylindrical surface has the same length. At the front end of the plug, on the other hand, the optical fiber end is usually radially displaced from the plug axis by a certain eccentricity as a result of inherent imprecision in manufacturing the plug and assembling the plug and fiber.

In those circumstances, it has been found that, by providing in the guide means for an offsetting of the axes of the two plugs (so that they are not coaxial) while maintaining those axes aligned co-paralle, and by rotating one or both of the plugs around its axis, the ends of the two optical fibers can be brought into a registration producing an optical splicing thereof which is good enough so that infra red or other "light" radiation can be transmitted from one to the other fiber with very little loss.

A connector employing the technique just described to optically splice two optical fibers is disclosed in U.S. Pat. No. 4,545,644 issued Oct. 8, 1985 in the name of George F. DeVeau Jr. et a. and assigned to AT&T Bell Laboratories ("DeVeau"). Such connector comprises an alignment bracket provided by a rectangular piece of sheet metal bent to conform to the shape of the outline of a triangular prism. The two ends of the sheet around the periphery of the prism are separated from each other one one side of the prism by a gap parallel to the prism's axis. Within the triangular prismatic interior of the bracket, three cylindrical glass rods are at the three corners of the triangular cross-section of the bracket, and are in spaced parallel relation to provide a central passage extending through the bracket inwardly of the three rods.

The two fiber terminating plugs are inserted into opposite ends of the passage and are held in end-to-end aligned relation therein by the resilient force of the bracket as exerted on the plugs through the rods. These rods have flats formed on them. By relative angular rotation of the two plugs about their axes, the optical fibers terminated by these plugs are caused to become optically spliced.

In the DeVeau connector, the glass rods which align the plugs are fastened by adhesive to the enveloping resilient sheet metal bracket. The use of adhesive to provide such fastening has the disadvantages among others that the bond between the rods and the bracket is not always reliable, the bonding power of the adhesive material tends to deteriorate with time, and the introducing into the connector of the adhesive and its subsequent curing undesirably adds to the time and effort required to manufacture the DeVeau connector.

SUMMARY OF THE INVENTION

The above-mentioned and other disadvantages of the DeVeau connector are overcome according to the invention in one of its aspects by providing a connector for optical fiber terminal plugs comprising: sleeve means, guide means disposed in said sleeve means alongside a passage therethrough for receiving such plugs end-to-end, spring contact means adapted by resilient deflection to press such plugs and guide means together to align such plugs, holder means cooperable with such guide means to hold such guide means mechanically (as distinct from by adhesive) in fastened relation with such sleeve means, and means for decoupling such spring contact means and holder means so that such holding by the latter of the guide means is not interrupted by the mentioned deflection of the spring contact means. In such connectors, it may be (for example but without restriction) that the sleeve means is a sleeve of resilient sheet metal, the holder means may be tabs of such metal integral with the sleeve and adapted by deflection to hold the guide means fastened to the sleeve, and that protrusions on the tabs and beveling on the guide means may be used to promote the deflection of the tabs.

According to the invention in another of its aspects, the sleeve means may be formed to have along one side thereof an opening communicating with the sleeve interior and having on its opposite sides, top and bottom lip portions of the sleeve means, and the guide means within the sleeve means may be configured to make room in the interiod of the sleeve means for insertion into such opening of a tool by which such lip portions may be pried apart to allow reception of the two plugs within the sleee means.

There are aspects of the invention which are improvements in the optical fiber connectors disclosed in U.S. patent application Ser. No. 912,021 entitled "Optical Fiber Connecting Means", filed Sept. 29, 1986 in the name of L. J. Freeman et al. and assigned to Bell Telephone Laboratories, Inc., the assignee hereof. Such application is incorporated herein by reference and made a part hereof.

BRIEF DESCRIPTION OF THE DRAWINGS

For a better understanding of the invention, reference is made to the following description of an exemplary embodiment thereof, and to the following drawings wherein.

In the description which follows, elements designated by the same reference numbers but by different alphabetical suffixes for these numbers are counterpart elements, and a description of one shall, unless the context otherwise indicates, be deemed to apply similarly to its counterpart.

DETAILED DESCRIPTION

Figure 1:
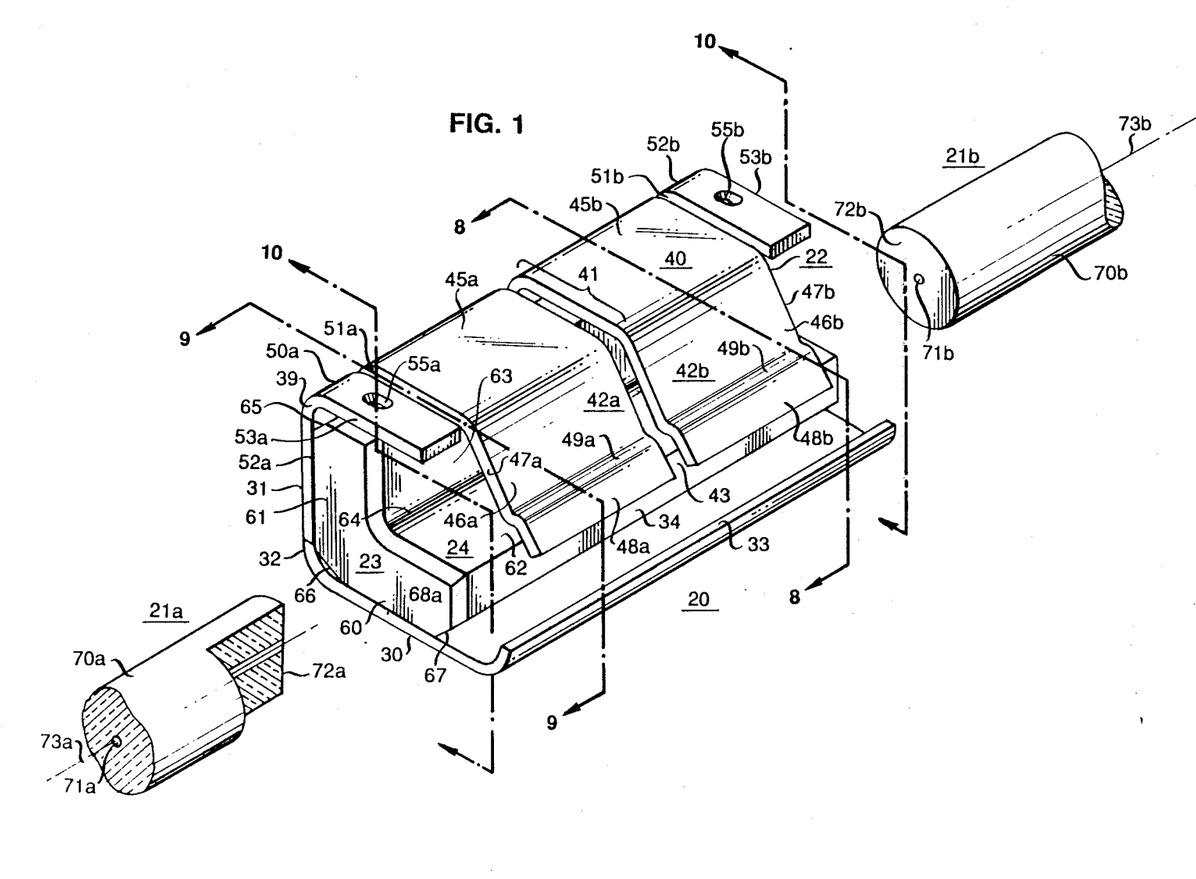
FIG. 1 is an isometric view of a connector according to the invention, and of two optical fiber terminating plugs used with such connector.
Figure 2:
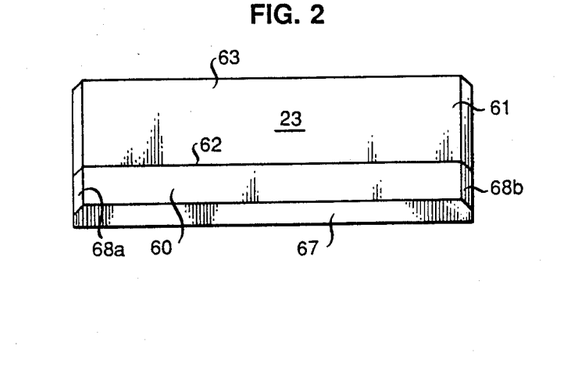
FIG. 2 is a front elevation of the guide means included in the FIG. 1 connector.
Figure 3:
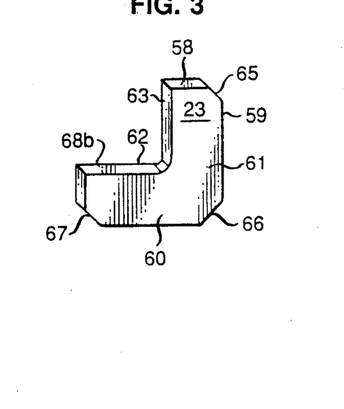
FIG. 3 is a right side elevation of the FIG. 2 guide means.
Figure 4:
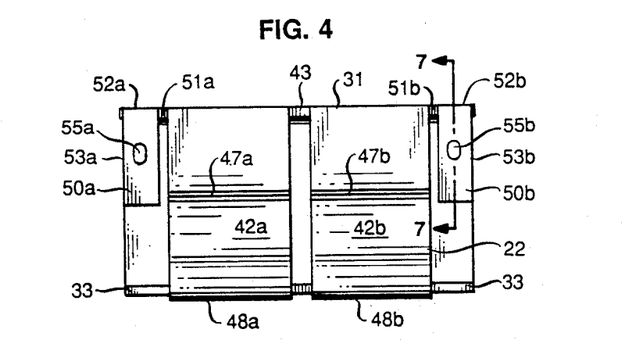
FIG. 4 is a plan view of the sleeve means included in the FIG. 1 connector.

Referring now to FIG. 1, the reference number 20 designates a connector for connecting together two optical fiber terminal plugs 21a, 21b also shown in that figure. Connector 20 comprises a longitudinally extending sleeve means 22 and a longitudinally extending guide means 23 disposed in sleeve means 22 alongside a passage 24 therethrough in which the plugs 21 are adapted to be received in end-to-end relation.

Sleeve means 22 is a tubular body formed from a single piece of resilient sheet metal and comprising a horizontal bottom 30 and a back 31 laterally at the rear of bottom 30 and joined thereto by a faired bend 32 to be upstanding from the sleeve bottom. Along the front margin of such bottom, the sheet metal of sleeve 22 is shaped to have a rounded upward bend forming a lip 33 of upwardly concave arcuate shape in vertical-lateral cross-section and extending longitudinally the whole length of the sleeve. Lip 33 acts as the bottom lip for an opening 34 communicating from the exterior environment of the front side of sleeve 22 into the interior of the sleeve and into the mentioned passage 24 therein.

Figure 5:
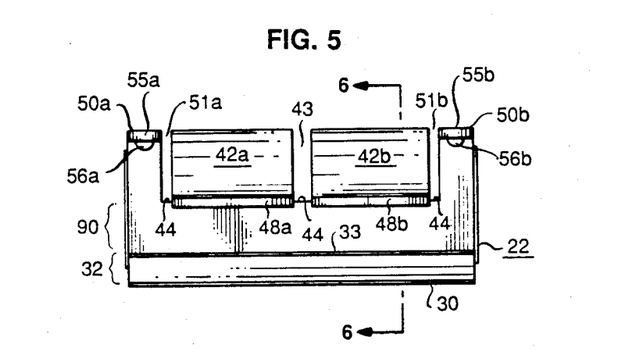
FIG. 5 is a front elevation of the FIG. 4 sleeve means.

The sleeve back 31 is joined by a faired bend 39 to the sleeve top 40 of which the portion adjacent bend 39 is in the form of a generally horizontal shelf 41. Top 40 provides intermediate the ends of sleeve 22 a spring contact means comprising two resilient fingers 42a, 42b divided by a slit 43 extending from the front of top 40 laterally to the rear of such top and then down back 31 about half of the way of its vertical extent. The slit 43 terminates within such extent at a vertically narrow sleeve region 44 (FIG. 5) extending longitudinally from end to end of the sleeve and operably acting as a resilient hinge as later described.

Resilient finger 42a comprises a rear top portion 45a provided by a part of shelf 41, a forward portion 46a joined at knee 47a to portion 45a and sloping downwards from that knee to a lip 48a at the front margin of portion 47a, and the lip 48a itself. Lip 48a is arcuate and downwardly concave in lateral vertical cross-section. (See corresponding lip 48b in FIG. 6.) The lip 48a is turned outwardly and upwards from the downwardly sloping finger portion 46a of finger 42a so that the rear of the lip slopes upwardly from its juncture 49a with portion 46a, and the lip as a whole is more horizontal than that portion.

Figure 6:
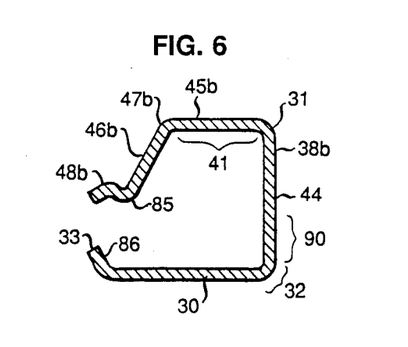
FIG. 6 is a right side elevation of a vertical cross-section of the FIG. 4 sleeve means, taken as indicated by the arrows 6—6 in FIG. 5.

Resilient finger 42b has the same construction as finger 42a and comprises elements 45b, 46b, 47b, 48b, 49b which are counterparts of the previously described elements 45a–49a of finger 42a.

The rear top portion 45b of finger 42b is joined to the hinge region 44 by a section 38b of sleeve back 31 (FIG. 6). Portion 45a of finger 42a is joined to hinge region 44 by a similar section (not shown). The forward lips 48a, 48b together provide a split lip 48 which acts as the top lip for the opening 34 in the sleeve 22.

The top 40 of sleeve 22 also provides holder means comprising resilient tab means in the form of two resilient tabs 50a, 50b disposed at the longitudinal ends of sleeve 22 on opposite sides of the two fingers 42a, 42b. Tab 50a is separated from finger 42a by a slit 51a extending laterally from the front of sleeve top 40 to its rear and then down the vertical extent of sleeve back 31 to the hinge region 44 of the sleeve. The tab 50a can thus be considered to comprise lower and upper arms 52a and 53a joined to each other at bend 39, the lower arm 52a extending generally vertically from sleeve hinge region 44 to that bend, and the upper arm 53a extending generally horizontally from bend 39 to the front of the shelf portion 41 of sleeve top 40. Tab 50a thus does not extend from bend 39 laterally forward as far as does the resilient finger 42a next to that tab. Moreover tab 50a is not longitudinally as wide as its companion finger 42a.

In the course of making the sleeve 22, the arm 53a of the tab 50a receives from a stamping punch (or like tool) a blow which displaces and deforms the constituent metal of the arm to form in its top a dimple 55a and, in its bottom, a corresponding pronounced downwardly salient protrusion 56a (FIG. 6) beneath the dimple 55a. Protrusion 56a is both laterally localized and longitudinally localized in the sense that such protrusion covers only a limited extend of the bottom of arm 53a of tab 50a in each of the lateral and longitudinally dimensions of that arm.

Figure 7:
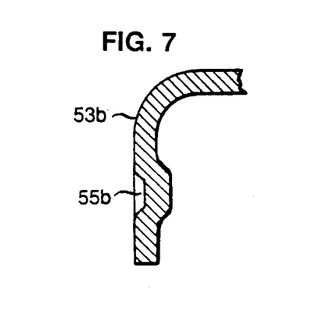
FIG. 7 is an enlarged right side elevation in vertical cross-section of a detail of the FIG. 4 sleeve means, such cross-section being taken as indicated by the arrowws 7—7 in FIG. 4.
Figure 8:
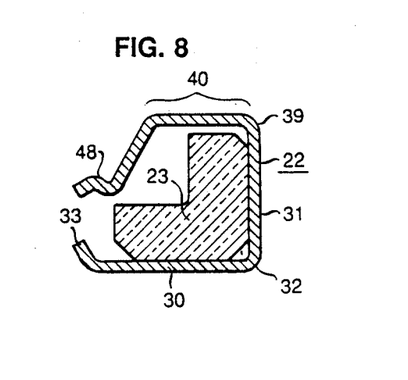
FIG. 8 is a right side elevation of a vertical cross-section of the whole FIG. 1 connector, such cross-section being taken as indicated by the arrows 8—8 in FIG. 1.

Tab 50b is separated from finger 42b by a slit 51b extending down sleeve back 31 to hinge region 44. Tab 50b comprises elements 52b, 53b, 55b, 56b similar to their respective counterpart elements 52a, 53a, 55a of tab 5a. Details of the dimple 55b and protrusion 56b of tab 50b are shown in FIG. 7.

Turning now to the guide means 23 in sleeve means 22, such guide means is in the form of a longitudinally extending alignment block of L-shaped in lateral-vertical cross-section and comprising (a) a horizontal base segment 60 resting on the bottom 30 of sleeve 22, and (b) a vertical rear segment 61 disposed to the rear of segment 60 to be in juxtaposed relation with the back 31 of the sleeve. The block 23 is symmetrical in the sense that, by rotating the block first 90 degrees counterclockwise (FIG. 1) about its horizontal axis and then one-hundred and eighty degrees about its vertical axis, element 61 becomes a base segment exactly duplicating the previous base segment 60, and element 60 becomes a rear segment exactly duplicating the previous rear segment 61.

Base segment 60 has on its top a smooth horizontal planar reference surface 62, and rear segment 61 has at its front a smooth vertical planar reference surface 63 at 90 degrees to surface 62 and joined thereto by fairing 64. Disposed between the top surface 58 and the back surface 59 of rear segment 61 is a bevel 65 parallel to the horizontal axis of block 23 and extending longitudinally the whole length of the block. A similar bevel 66 is disposed between the back face of rear segment 61 and the bottom face of base segment 60. Another similar bevel 67 is formed between the bottom and front faces of base segment 60 to provide for a bevel at the top and rear of the block 23 when it is symmetrically reversed as earlier described. Moreover, the block 23 has a bevel 68a at the intersection of the left hand end surface (FIG. 1) of the block with the forward and upper facing longitudinal surfaces of the block. There is a similar bevel 68b at the intersection of the right end surface of block 23 with the forwardly and upwardly facing longitudinal surfaces thereof.

The block 23 in connector 20 is used to help align the optical fiber terminating plugs 21a, 21b. Plug 21a is a glass cylinder of which the exterior 70a can be considered for the purposes hereof as being a perfect circular cylindrical surface. Formed within plug 21a is a bore 71a extending axially all the way through the plug to the plug's front face 72a. Bore 71a has received therein the end segment of an optical fiber 73a of which the free end terminates at, and flush with, the plug's front face 72a as earlier described. Fiber 73a at the front face is likely to be eccentric in relation to the true axis of the plug so as to be radially displaced by a small amount from that axis.

The other plug 21b is a terminal plug for an optical fiber 73b. That plug has elements 70b–72b which are counterparts of the elements 70a–72a of plug 21a excepting that the cylindrical exterior 70b of plug 21b is slightly greater in diameter than the exterior 70a of plug 21l.

USE AND FEATURES OF EMBODIMENT

Connector 20 is assembled by sidewise insertion of the block 23 into the sleeve 22 from one of its ends so that the block initially is in front of the protrusions 56 but has the same orientation in space as is shown in FIG. 1. The block is then given rearward movement relative to the sleeve until the block is brought into the final position relative to the sleeve which is shown in FIG. 1, and in which the segment 60 of the block abuts the bottom 30 of the sleeve, and the back side of segment 61 of the block is in contact at its bottom with the sleeve back 31 and is in juxtaposed relation therewith.

In the course of such movement to bring block 23 to its final position, the bevel 65 on the block 23 engages with the protrusions 56 on the resilient tabs 50 to produce upward resilient deflection of both of such tabs. Tabs 50 are accordingly resiliently stressed to exert through protrusions 56 on block 23 a force from each tab clamping the block between the tab and the bottom 30 of sleeve 22. It should be noted that the employment of bevel 65 to produce the deflection of tabs 50 is advantageous because the slanting face of the bevel causes such deflection to occur by a wedging action of block 23 on the tabs, which wedging action causes in the clamping force a progressive gradual increase which avoids cracking of the material of block 23.

The presence of the protrusions 56 permits the mentioned rearward movement of the block 23 relative to sleeve 22 to deflect the tabs 50 while also allowing such rearward movement to continue to the point of bringing the bottom of the block into contact with the back 31 of sleeve 22 (bevel 66 permits the contact just mentioned while allowing sleeve back 31 to be joined to sleeve bottom 30 by faired bend 32). Further, such protrusions localize to the areas occupied thereby on the tabs the regions of such tabs over which they exert force on the block. That is, such regions are not distributed over the whole undersides of the upper arms 53 of the tabs as such regions would be if protrusions 56 were not present. Still further, the presence of protrusions 56 reduces the effect which deviations from standard in the positioning or dimensioning of the tabs and/or of the block (relative to the reat of the sleeve) might have on the forces exerted by the tabs on the block.

By following the manually performed steps described above, block 23 is inserted into sleeve 23 to be held in firmly fastened relation therewith by the resilient tabs 50 on the sleeve, and the connector 20 is now complete and ready for use.

The connector 20 is used as follows.

Figure 10:
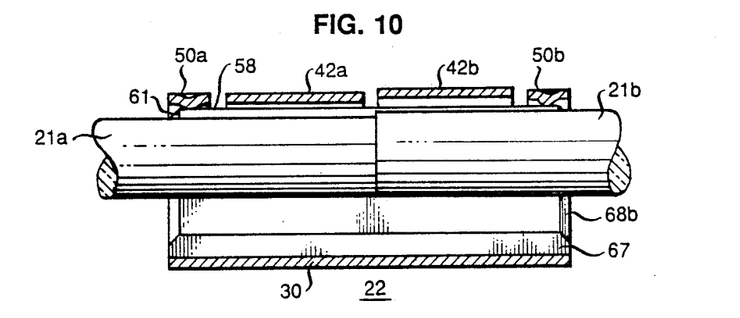
FIG. 10 is a front elevation partly in cross section of the combination of the connector shown in FIG. 1 and of the plugs shown therein.

The upper and lower jaws 81 and 82 of a pliers tool 80 are inserted into the front opening of the connector 20. Room is made in the interior of the connector for such insertion by virtue of the facts that base segment 60 of guide 23 is smaller in lateral width than sleeve bottom 30, and that tabs 50 hold guide 23 engaged at its bottom with sleeve back 31. As a result the front of the base segment is positioned rearward of the lips 48 and 33 on opposite sides of such opening to provide space inwards of such lips within the connector. The jaws of tool 80 are inserted into opening 34 to that upwardly and downwardly projecting nibs 83 and 84 at the front ends of, respectively, jaws 81 and 82 are caused to register with the shown surface 85 and 86 which are on the inner sides of, respectively, lips 48 and 33, and which both slope away from the lateral center plane of opening 34.

After the mentioned insertion has been made, tool 80 is operated to spread jaws 81 and 82 to thereby pry upper lip 48 apart from lower lip 33. During such spreading the tool 80 tends to be held engaged with the connector 20 by the bearing of nibs 83 and 84 with the surfaces 85, 86 of which the slopes are directed to exert inward components of force on the nibs as a result of such bearing.

The prying apart of lips 33 and 48 by tool 80 causes resilient fingers 42a and 42b to be upwardly deflected relative to sleeve bottom 30 until the passage 24 through the connector is opened wide enough to permit insertion with clearance of the plugs 21a, 21b into longitudinally opposite ends of the passage, and subsequent moving of the plugs in the passage until their front ends are in end-to-end relation. Such insertion is aided by the bevels 68 in guide 23 which serve to guide the lugs 21 into passage 24.

Tool 80 is then removed from the connector to permit relaxation of the fingers towards their undeflected positions until those fingers 42a, 42b engage with, respectively, plugs 21a and 21b to exert on those plugs yieldable forces (produced by the resilient stressing of the fingers) pressing the plugs against the reference surfaces 62, 63 on guide 23. As a result of such pressing, the plugs become aligned by those surfaces such that the plug axes become and remain co-parallel with each other. As a further result, the yieldable forces on the plugs serve to retain them within the connector 20 but are moderate enough to permit the plugs to be rotated about their respective axes while remaining aligned and in contact with surfaces 62, 63. By so rotating one or both of the plugs, the free ends of the optical fibers 73a, 73b can, as is well known in the art, be brought into registration to thereby produce an optical splicing of the two fibers.

Further consideration will now be given to the forces involved in the use of connector 20.

Figure 9:
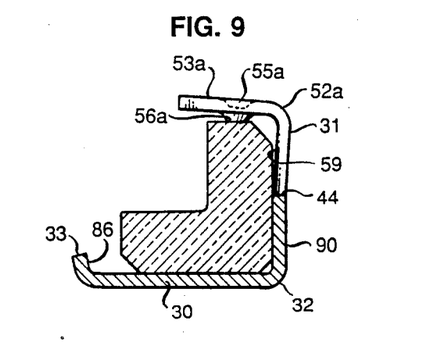
FIG. 9 is right side elevation of another vertical cross-section of the whole FIG. 1 connector, such cross-section being taken as indicated by the arrows 9—9 in FIG. 1.

The tab 50a (with its lower and upper arms 52a, 53a) and the tab 50b (with its lower and upper arms 52b, 53b) can each be considered to be a resilient beam with an anchored end resiliently hinged at sleeve region 44 to a portion 90 (FIG. 9) of sleeve back 31 extending from region 44 to faired bend 32. Portion 90 can also be considered to be a resilient beam with an anchored end resiliently hinged at bend 30 to the bottom 30 of sleeve 22 of the connector. Because, however, portion 90 extends over the whole longitudinal dimension of sleeve 22, the "beam" 90 is much stiffer than "beams" 50a and 50b. When, as earlier described, the tabs 50a, 50b are resiliently deflected by insertion of block 23 into sleeve 22, what happens is that the forces caused by such insertion produce a very small angular deflection rearwardly of portion 90 about resilient "hinge" 32 and a substantially larger angular deflection of each of tabs 50a, 50b about hinge 44. The angular deflection of portion 90 about hinge 32 is so small relative to the angular deflections of tabs 50 about hinge 44 that the former deflection will from now on be neglected except for the purpose of discussing the coupling and decoupling of the deflections of various elements of sleeve 22.

Accordingly, for all except the purpose just mentioned, the total angular deflections of tabs 50 can be considered to occur around hinge 44. Those angular deflections produce active forces c exerted by the tabs 50 on the top of guide 23. It is such active c forces which are the mentioned clamping forces by which guide 23 is preloaded to be held fastened in translationally and angularly fixed relation with sleeve 22.

Figure 11:
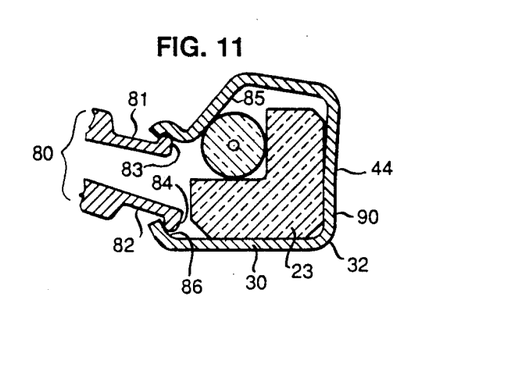
FIG. 11 is a right side elevation of a vertical-lateral cross-section of the FIG. 10 combination.

Like tabs 50, the resilient fingers 42 with their respective upper back portions 38 can be considered resilient beams attached at hinge 44 to the lower back portion 90. Fingers 42, when defected upward from their unstressed FIG. 1 position, generate yieldable forces y directed inwards towards the interior of sleeve 22. When, as shown in FIG. 11, the resiliently deflected fingers 42 contact the plugs 21 in connector 20, the fingers exert those forces y on such plugs for maintaining them aligned in connector 20 in the angular positions to which these plugs have been adjusted. Such forces y can reasonably be considered as resulting wholly from the angular deflections of the resilient beams 42, 38 about hinge 44, and the value of those forces y varies directly with amount of angular deflection of the fingers 42.

After guide 23 has been fitted into sleeve 22, but before the plugs 21 have been inserted into the sleeve, the clamping forces c have a maximum value $C_o$ causing guide 23 to be securely held in fixed positional relation relative to sleeve 22. It will be recalled that, at that time, the lower back portion 90 is angularly deflected rearward about bend 32 by a very slight amount while the tabs are deflected by a greater angle about hinge 44. Now assume that pliers tool 80 is used to deflect fingers 42 by the amount necessary for plugs 21 to be easily and conveniently inserted into the passage 24 of the connector. Such deflection of the fingers will produce the mentioned force y of a value $Y_1$ exerted by each finger on the pliers, and such deflection of the fingers will produce an additional small rearward angular deflection about bend 32 of sleeve portion 90. That small additional deflection will be manifested along hinge 44 not only at the base of the fingers 42 but also at the base of the tabs 50. Accordingly, the mentioned deflection of the fingers causes the initial clamping force $c_o$ exerted by the tabs to be reduced to the value $c_1$ given by the expression $$c_1 = c_o - ky_1$$

where k is a coefficient which represents the coupling of the deflection of each finger to the adjacent tab, and the value of which coefficient varies inversely with the length of the slit 51 between the finger and tab as a percentage of the greatest possible length of the slit, i.e., that length at which it would cut sleeve 22 into two parts. An advantage of connector 20 is that the actual lengths of all of slits 43, 51a and 51b are a high enough percentage of the greatest possible lengths thereof to reduce the factor k to a value low enough that the clamping forces exerted by tabs 50 on guide 23 when fingers 42 are deflected as described by the pliers are forces remaining high enough in value to continue to firmly hold guide 23 in fixed positional relation with the sleeve 22.

While the foregoing is a simplified and plausible (it is deemed) explanation of the forces involved in the use of connector 20, and of the origins of such forces, the invention hereof is not to be considered as limited by such explanation, and I do not intend to be bound thereby.

With regard to some further details of connector 20, the alignment block 23 may conveniently be made of PYREX ® glass or some other dimensionally stable material, and the sleeve 22 may be constituted of sheet metal which is a beryllium-copper alloy. The length dimension of sleeve 22 of connector 20 may be 0.469 inches with the other dimensions of the connector being to scale in the FIG. 1 showing of the connector.

The above described embodiment being exemplary only, it is to be understood that additions thereto, omissions therefrom and modifications thereof can be made without departing from the spirit of the invention, and that, accordingly, the invention is not to be considered as limited save as is consonant with the recitals of the following claims.

I claim:

1. A connector for two optical fiber terminal plugs comprising: sleeve means, guide means disposed in said sleeve means alongside a passage therethrough for receiving said plugs end-to-end therein, spring contact means provided by part of said sleeve means and adapted by resilient deflection thereof to press said end-to-end plugs and guide means together to thereby align such plugs, holder means provided by part of said sleeve means and cooperable with said guide means to mechanically hold it fastened with said sleeve means, and means for decoupling said spring contact means and holder means so that such holding of said guide means is uninterrupted by such deflection of said spring contact means.

2. A connector according to claim 1 in which said decoupling means comprises slitting formed in said sleeve means and disposed therein to at least partly isolate such deflection of said spring contact means from said holder means.

3. A connector according to claim 1 in which such deflection of said spring contact means produces a first yieldable force exerted by such means, said holder means is resiliently stressed to produce a second force exerting on said guide means an inward force to hold such means fastened with said sleeve means, and in which said inward force continues to hold said guide means in firmly fastened relation with said sleeve means upon deflection of said spring contact means to a degree permitting convenient insertion of said plugs in said passage.

4. A connector according to claim 1 in which said holder means comprises clamping portions of said sleeve means disposed on opposite sides of said guide means and clamping said guide means between them to hold such guide means fastened with said sleeve means.

5. A connector accordingly to claim 4 in which said clamping portions comprise resilient tab means forming part of said sleeve means and resiliently stressed to exert on said guide means of inward force which clamps such guide means between such tab means and part of said sleeve means opposite said tab means.

6. A connector according to claim 5 in which said tab means has, on a side thereof towards said guide means laterally localized protrusion means exerting such inward force on said guide means.

7. A connector according to claim 5 in which said guide means and passage extend longitudinally through said sleeve means, and in which said tab means is laterally on the same side of said sleeve means in relation to said guide means as is said contact means, and said tab means is longitudinally displaced from said spring contact means.

8. A connector according to claim 5 in which said guide means and passage extend longitudinally through said sleeve means, and in which said tab means comprises two resilient tabs longitudinally displaced from each other, and in which such opposite part of said sleeve means comprises two portions thereof respective to said tabs and disposed opposite them such that said guide means is between said tabs and said portions.

9. A connector according to claim 8 in which said two tabs are on the same side of said guide means as is said spring contact means.

10. A connector according to claim 8 in which said two tabs are disposed longitudinally outward of said spring contact means on longitudinally opposite sides thereof.

11. A connector according to claim 1 in which said sleeve means is a longitudinally elongated tubular body of sheet material comprising a horizontal bottom and a vertical back integral with, and laterally to the rear of, said bottom and upstanding therefrom, and in which said spring contact means comprises resilient finger means of said material integral with said back and extending from the top of said back laterally foward over said passage to a front end of said finger means spaced above the front end of said bottom to provide in said body at the front thereof a longitudinally extending opening into said passage.

12. A connector according to claim 11 in which said finger means and said bottom are shaped at their front ends to provide forwardly projecting top and bottom marginal lips of said sheet material disposed on opposite sides of said opening and adapted to be pried apart by a tool inserted in said opening.

13. A connector according to claim 12 in which the front of said guide means is disposed rearward of said bottom lip to render the upper side of such lip accessible to contact by such tool.

14. A connector according to claim 12 in which the said finger means adjacent said top lip slopes downwardly towards said lip, and in which said lip is turned outward in relation to such sloping portion to be more horizontal than such portion.

15. A connector according to claim 11 in which said guide means is of "L" shaped in lateral vertical cross-section and comprises a horizontal base segment and a vertical rear segment disposed to the rear of such horizontal segment to be juxtaposed with said back side of said sheet means, and in which said vertical guide segment has at its top and rear a longitudinally-extending edge which is beveled over at least part of its length.

16. A connector according to claim 11 in which said resilient finger means comprises two resilient fingers of said material which are separated from each other by a slit extending from the front of said tubular body to the top of said back of such body and then partly down the vertical extent of said back, and in which said holder means comprises two resilient tabs of said material extending forwardly from the top of said back of said body on longitudinally opposite sides of the longitudinal extent of said body occupied by said two fingers, said tabs being separated from said fingers by slits formed in said tubular body and extending from the front thereof to the top of the back of such body and then partly down the vertical extent of said back.

17. A connector for two optical fiber terminal plugs comprising: a longitudinally elongated tubular sleeve comprised of resilient sheet metal and comprising a horizontally extending bottom and a vertically extending back laterally to the rear of, and upstanding from, said bottom guide means disposed in said sleeve alongside a longitudinal passage therethrough for receiving said plugs in end-to-end relation therein, said guide means being of "L" shape in lateral-vertical cross section and comprising a horizontally extending base segment disposed on such sleeve's bottom and a vertically extending rear guide segment juxtaposed with said sleeve's back resilient finger means integral with said sleeve and extending from the top of its back laterally forward to overlie said passage, said finger means being adapted by deflection thereof to press said end-to-end plugs against said guide segments to thereby align such plugs, and a pair of resilient tabs integral with said sleeve and extending on longitudinally opposite sides of said finger means laterally forward from the top of said sleeve's back to be disposed over the top of said rear guide segment, means for at least partly decoupling said tabs from said deflection of said finger means, and said tabs being resiliently stressed to exert on said rear guide segment a downward clamping force maintaining said guide means inside said sleeve in fastened relation therewith.

18. A connector according to claim 17 in which said decoupling means comprises a pair of slits disposed on longitudinally opposite sides of said finger means between such finger means and such two resilient tabs, each of said slits extending from the front of said sleeve laterally inward to the top of the back thereof and then part way down the vertical extend of such back.

19. A connector according to claim 17 in which said resilient finger means comprises two resilient fingers longitudinally adjacent each other, and in which said two fingers are separated by a slit disposed longitudinally between and extending from the front of said sleeve laterally inward to the top of the back thereof and then part way down such back.

20. A connector according to claim 17 in which each of said tabs has on its underside a laterally localized downward protrusion disposed laterally outward of the inner end of such tab to be in contact with the top of said rear guide segment at a location laterally intermediate the front and back thereof, such protrusion exerting said downward clamping force on said segment.

21. A connector according to claim 20 in which the top and back sides of said rear guide segment have between them a longitudinal edge at the rear of such segment, and in which such edge is beveled to have a beveled portion thereof disposed laterally to the rear of the protrusion on each of said tabs.

22. A connector according to claim 17 in which said resilient finger means and said sleeve's bottom respectively terminate at said sleeve's front in top and bottom marginal lips on opposite sides of an opening disposed at the front of said sleeve and extending into said passage, and in which the front side of said base guide segment is disposed laterally rearward of said lips to make room within said sleeve for insertion in said opening of a tool for prying said lips apart.

23. A connector according to claim 22 in which said finger means has a portion sloping downwardly to said top lip, and such lip is turned outwardly to be more horizontal than such portion.

24. A connector for two optical fiber terminal plugs comprising: a sleeve of resilient sheet metal, a pair of resilient tabs formed of said metal and integral with said sleeve and spaced from each other in its length, said tabs being resiliently deflectable away from portions of said sleeve opposite said tabs across the sleeve's interior, guide means disposed in said sleeve alongside a passage therethrough for receiving said plugs end-to-end in said passage, said guide means being wedgingly inserted between said tabs and such sleeve portions so that said tabs are deflected away from said portions by said guide means to exert on such guide means a force clamping it between said tabs and said portions, and means for maintaining said plugs when end-to-end in said passage in aligned relation with each other.

25. A connector according to claim 24 in which said tabs have respective protrusions on the sides of said tabs towards said guide means, and in which said tabs exert through said protrusions said clamping force on said guide means.

26. A connector according to claim 25 in which said guide means has beveled portions thereon for producing by a wedging action of such portions such deflection of said tabs away from said sleeve portions.

* * * * *